United States Patent [19]
Sulger, Sr.

[11] 3,781,751
[45] Dec. 25, 1973

[54] PRESSURE TRANSDUCER
[75] Inventor: Harold Sulger, Sr., East Northport, Long Island, N.Y.
[73] Assignee: Dynamic Instrument Corp., Plainview, L.I., N.Y.
[22] Filed: May 18, 1972
[21] Appl. No.: 254,441

[52] U.S. Cl. .................................. 338/42, 320/46
[51] Int. Cl. ............................................ H01c 13/00
[58] Field of Search.................... 338/36, 41, 42; 73/398 R, 398 AR; 320/46, 52; 323/95, 96

[56] References Cited
UNITED STATES PATENTS

| | | | |
|---|---|---|---|
| 3,030,598 | 4/1962 | Cerny et al................ | 73/398 AR X |
| 3,080,757 | 3/1963 | Johansson...................... | 338/42 X |
| 3,281,640 | 10/1966 | Mas...................................... | 320/46 |
| 3,460,019 | 8/1969 | Mas................................ | 338/42 X |

Primary Examiner—C. L. Albritton
Attorney—Eugene E. Geoffrey, Jr.

[57] ABSTRACT

A battery pressure transducer for producing a change in resistance with changes in pressure which includes a diaphragm having one side subject to pressure and the other side carrying a conductive layer. An annular resistive element is placed in slightly spaced relationship to the conductive layer and has a center contact and an outer peripheral contact. As pressure deflects the diaphragm, the conductive layer shunts part of the resistance and, thus, decreases the resistance between the contacts by an amount proportional to the pressure.

8 Claims, 6 Drawing Figures

PATENTED DEC 25 1973 3,781,751
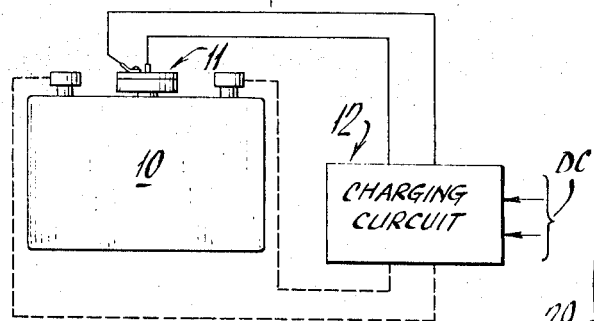
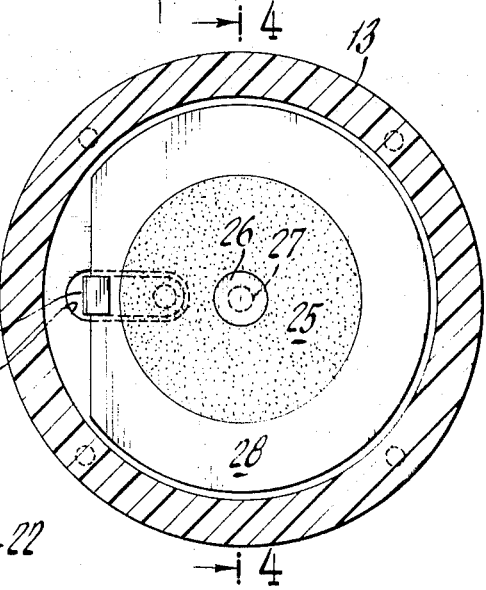
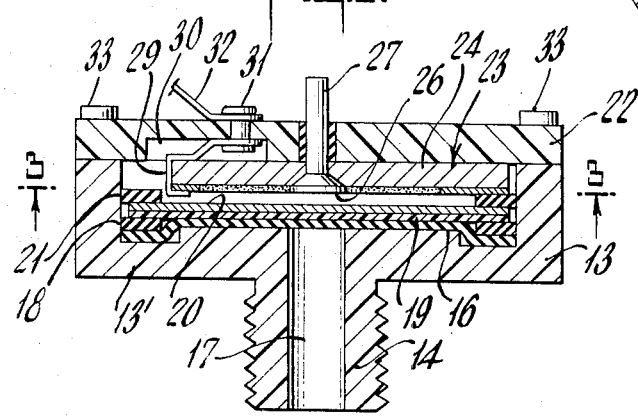
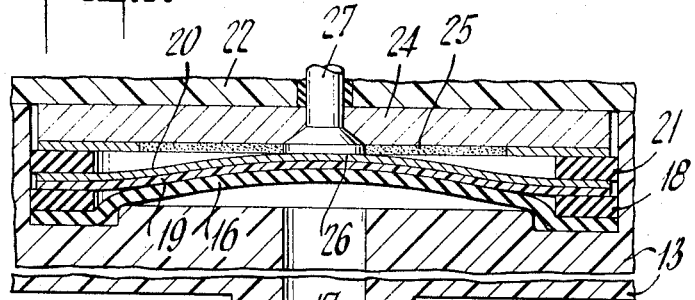
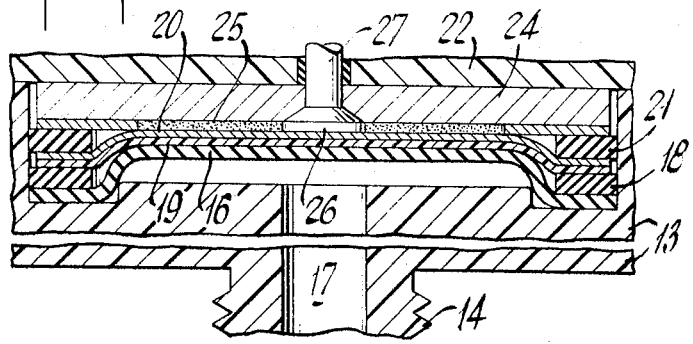
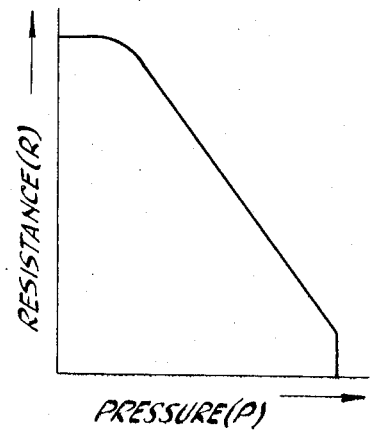

PRESSURE TRANSDUCER

This invention relates to battery chargers and more specifically to a pressure responsive transducer for use in controlling the charging rate by the gas pressure developed in the battery being charged.

While it is well known that batteries, such as silver-cadmium and lead-acid batteries, produce gas upon being charged and that by either partially or completely sealing each battery cell the developed gas pressure during the charging procedure can be used to control the charging rate since excessive pressure indicates too high a charging rate and vice versa. In controlling the charging rate, however, the transducer should preferably be arranged to provide a substantially linear change in an electrical characteristic, such as resistance, with changes in pressure. While numerous devices have been suggested for the attainment of this end, known devices have not been found to provide the desired degree of linearity and reliability. This invention overcomes the foregoing difficulties and provides a novel and improved pressure transducer which is highly sensitive to pressure changes and reliably reproduces a predetermined change in resistance with changes in pressure.

Another object of the invention resides in the provision of a novel and improved transducer for producing changes in an electrical characteristic with changes in pressure which is characterized by its simplicity, dependability, and relatively low cost.

Still another object of the invention resides in the provision of a novel and improved pressure transducer for producing changes in resistance in response to pressure changes.

The pressure transducer in accordance with the invention utilizes in one form, a resistance element and a flexible diaphragm, the latter having a conductive coating on the side facing the resistance element. As pressure is applied to the diaphragm, the center is first deflected and contacts said element. As the pressure increases, the diaphragm flattens out against the resistance element to bridge successive portions of it and thus gradually reduce the resistance between the terminals thereof.

The above and other advantages and objects of the invention will become more clearly understood from the following description and accompanying drawings forming part of this application.

In the drawings:

FIG. 1 is a diagrammatic illustration of a battery charger and cooperating pressure transducer, FIG. 2 is a cross-sectional view of the novel and improved pressure transducer of FIG. 1, FIG. 3 is a cross-sectional view of FIG. 2 taken along the line 3—3 thereof, FIG. 4 is an enlarged fragmentary view of the transducer of FIG. 2 showing an initial deflected position of the diaphragm, FIG. 5 is a view similar to FIG. 4 showing the diaphragm in the fully deflected position, and FIG. 6 is a graph showing the resistance characteristic of a linear transducer.

A battery charging circuit embodying a pressure transducer for controlling the charging current is shown in FIG. 1. In this figure the battery is denoted by the numeral 10, the pressure transducer by the numeral 11, and the charging circuit by the numeral 12. The charging circuit 12 may take any desired form that will function to control the charging current or voltage in response to a change in an electrical characteristic such as resistance. The charging circuit is supplied with a suitable form of d.c. current and the output to the battery is controlled in accordance with the resistance of the transducer 11. On form of charging circuit is shown in U.S. Pat. No. 3,281,640 granted to J. Mas.

The transducer 11 as shown in FIGS. 3 and 4 includes a cup-shaped housing portion 13 having an externally threaded tubular portion 14 extending from the bottom for engagement with a battery opening. A thin acid resistant elastomeric diaphragm 16 overlies the opening 17 within the housing portion 13 and is secured about its periphery by a ring 18 to form an airtight seal. A thin layer of plastic 19 having a conductive face 20 overlies the diaphragm 16 and is secured in position about its periphery by a ring 21. the rings 18 and 21 may be held in position by any suitable means such as screws (not shown) which extend through the rings and threadably engage openings in the bottom wall 13' of the housing portion 13.

The housing portion 13 is closed by an annular cover 22 which carries a resistance element generally denoted by the numeral 23. The element 23 comprises a plate 24 having a terminal circular layer of resistive material 25, a center contact 26 of conductive material and having a shank or terminal portion 27 extending through the plates 24 and 22. The contact 26 is electrically connected to the center of the resistive layer 25 and is essentially in the plane of the resistive layer. An annular layer of conductive material 28 surrounds and is electrically connected to the resistive layer 25. A contact 29 is electrically connected to the conductive layer 28 and is secured within a recess 30 by a rivet 31 extending through the plate 22 and engaging an external terminal 32. The contact 26 and erminal 27 together with the contact 29 and rivet 31 may function to hold the resistive element 23 on the plate 22. The plate 22 is secured to the housing portion 13 by a plurality of screws 33.

With the transducer as described above, the diaphragm structure consisting of layers 16, 19 and 20 will normally lie flat against the bottom of the housing portion 13 as shown in FIG. 2. As pressure is applied to the diaphragm through the opening 17, the diaphragm deflects upwardly until the conductive layer 20 contacts the center contact 26 as shown in FIG. 4. Continued increases in pressure will cause the diaphragm to gradually flatten against the resistance element 23 and cause the conductive layer 20 to shunt successive portions of the resistive layer 25 and thus gradually reduce the resistance between the terminals 27 and 32. When the diaphragm assumes the position shown in FIG. 5, the conductive layer 20 shunts the center contact 26 and the outer conductive layer 28, thus reducing the resistance of the transducer substantially to zero.

The transducer in accordance with the invention is particularly advantageous in that the pressure range can be readily selected by adjusting the stiffness of the diaphragm. This can be accomplished by appropriately selecting materials for the layers 16 and 19 and mounting them with the desired tension. Furthermore, the resistance element 25 may either have uniform resistance in order to provide a linear change in resistance with pressure as shown in FIG. 6, or the resistance element can be provided with any desired slope or taper so that the change in resistance between terminals 27 and 32 will change in a predetermined non-linear manner with changes in resistance.

While only one embodiment of the invention has been illustrated and described, it is apparent that alterations, modifications and changes may be made without departing from the true scope and spirit thereof as defined by the appended claims.

What is claimed is:

1. A pressure transducer comprising a housing having an opening therein for the admission of pressure, a resilient diaphragm within said housing and overlying said opening, said diaphragm having a conductive surface on at least one side thereof, a resistive element in spaced relationship to the conductive side of said diaphragm and contacts on said element, said diaphragm upon being deflected by the application of pressure to said opening will engage the element and shunt a portion thereof to decrease the resistance between said contacts whereby the resistance between said contacts will vary proportionally with changes in pressure.

2. A pressure transducer according to claim 1 wherein said resistive element is annular and includes a center contact and a peripheral contact.

3. A pressure transducer comprisng a housing having an opening therein for the admission of pressure, a conductive diaphragm within said housing and overlying said opening, a resistive element in spaced relationship to said diaphragm and contacts on said element, said diaphragm upon being deflected by the application of pressure to said opening will engage the element and shunt a portion thereof to decrease the resistance between said contacts whereby the resistance between said contacts will vary proportionally with changes in pressure, said diaphragm comprising a layer of resilient material, an overlying layer of plastic material, and a conductive layer adhered to the outer surface of said plastic layer.

4. A pressure transducer comprising a housing having an opening therein for the admission of pressure, a conductive diaphragm within said housing and overlying said opening, a resistive element in spaced relationship to said diaphragm and contacts on said element, said diaphragm upon being deflected by the application of pressure to said opening will engage the element and shunt a portion thereof to decrease the resistance between said contacts whereby the resistance between said contacts will vary proportionally with changes in pressure, said housing consisting of an annular cup-shaped portion with said opening disposed centrally thereof, said diaphragm is secured within said housing portion in overlying relationship to said opening, and an annular plate closing said housing, said annular plate carrying said resistive element with said contacts extending through said plate.

5. A pressure transducer according to claim 4 wherein said diaphragm comprises a layer of resilient material, an overlying layer of a plastic material, and a conductive layer adhered to the outer surface of said plastic layer.

6. A pressure transducer according to claim 5 wherein said resistive element is annular and includes a center contact and a peripheral contact.

7. A pressure transducer according to claim 4 wherein said resistive element comprises a second annular plate, a circular layer of a resistive material carried by said second plate, a center contact on said second plate and having conductive means extending through said second plate and the first said plate to form an external terminal, a ring-shaped conductive layer on said second plate and surrounding said resistive layer, and contact means electrically coupled to said conductive layer and extending through the first said plate to form a second external terminal.

8. A pressure transducer according to claim 7 wherein said resistive element is annular and includes a center contact and a peripheral contact.

* * * * *